(12) United States Patent
Leiber et al.

(10) Patent No.: US 10,421,447 B2
(45) Date of Patent: Sep. 24, 2019

(54) ELECTRICALLY-DRIVEN PRESSURE REGULATOR AND VOLUME-DELIVERY UNIT

(71) Applicant: IPGATE AG, Pfäffikon Sz (CH)

(72) Inventors: Heinz Leiber, Oberrexingen (DE); Thomas Leiber, München (DE); Valentin Unterfrauner, München (DE)

(73) Assignee: IPGATE AG, Pfäffikon (CH)

( * ) Notice: Subject to any disclaimer, the term of this patent is extended or adjusted under 35 U.S.C. 154(b) by 569 days.

(21) Appl. No.: 15/022,134

(22) PCT Filed: Sep. 16, 2014

(86) PCT No.: PCT/EP2014/069723
§ 371 (c)(1),
(2) Date: Mar. 15, 2016

(87) PCT Pub. No.: WO2015/036623
PCT Pub. Date: Mar. 19, 2015

(65) Prior Publication Data
US 2016/0221562 A1    Aug. 4, 2016

(30) Foreign Application Priority Data
Sep. 16, 2013 (DE) .......... 10 2013 110 188
Oct. 30, 2013 (DE) .......... 10 2013 111 974

(51) Int. Cl.
*B60T 13/74* (2006.01)
*B60T 8/32* (2006.01)
(Continued)

(52) U.S. Cl.
CPC ............ *B60T 13/745* (2013.01); *B60T 8/326* (2013.01); *B60T 8/328* (2013.01); *B60T 8/4018* (2013.01);
(Continued)

(58) Field of Classification Search
CPC ........ B60T 8/267; B60T 8/326; B60T 8/4018; B60T 8/4081; B60T 13/686; B60T 13/745; F04B 17/044; F04B 19/20; F04B 49/12
See application file for complete search history.

(56) References Cited

U.S. PATENT DOCUMENTS 4,365,683 A * 12/1982 Adams ............... B62D 5/08
137/625.69
4,480,877 A * 11/1984 Resch ............... B60T 8/4275
188/181 A
(Continued)

FOREIGN PATENT DOCUMENTS

DE        19817190 C1     7/1999
DE    102005055751 A1    11/2006
(Continued)

OTHER PUBLICATIONS

Search Report dated Jul. 28, 2014 in DE Application No. 102013110188.7.

(Continued)

*Primary Examiner* — Abiy Teka
(74) *Attorney, Agent, or Firm* — Panitch Schwarze Belisario & Nadel LLP (57) ABSTRACT

The invention relates to a pressure-volume delivery system comprising a piston-cylinder unit with a piston acting on both sides (dual-action reciprocating piston), said piston having at least two different active surfaces in corresponding pressure chambers and the pressure chambers being connected to at least one consumer via hydraulic lines. The delivery system also comprises a drive for the piston-cylinder unit. According to the invention, the pressure chambers and/or hydraulic lines are interconnected by means of at least one or more switching valves connected in (Continued)

parallel and having a large flow cross-section (AV) and via a short hydraulic line or lines with low flow resistance.

24 Claims, 10 Drawing Sheets

(51) Int. Cl.
    *B60T 8/40*     (2006.01)
    *B60T 13/68*     (2006.01)
    *F04B 17/04*     (2006.01)
    *F04B 19/20*     (2006.01)
    *F04B 49/12*     (2006.01)
    *B60T 8/26*     (2006.01)

(52) U.S. Cl.
    CPC .......... *B60T 8/4081* (2013.01); *B60T 13/686* (2013.01); *F04B 17/044* (2013.01); *F04B 19/20* (2013.01); *F04B 49/12* (2013.01); *B60T 8/267* (2013.01)

(56) References Cited

U.S. PATENT DOCUMENTS

| | | | |
|---|---|---|---|
| 8,540,324 B2 | 9/2013 | Leiber et al. | |
| 9,168,481 B2 | 10/2015 | Wiedemann et al. | |
| 2004/0055452 A1* | 3/2004 | Tabor | E02F 9/2221 91/433 |
| 2009/0115247 A1 | 5/2009 | Leiber et al. | |
| 2012/0169112 A1* | 7/2012 | Jungbecker | B60T 8/4081 303/9.75 |
| 2012/0326492 A1* | 12/2012 | Mayer | B60T 8/4081 303/9.72 |
| 2013/0291535 A1 | 11/2013 | Leiber et al. | |

FOREIGN PATENT DOCUMENTS

| | | | | |
|---|---|---|---|---|
| DE | 102006030141 | A1 | 1/2008 | |
| DE | 102006061462 | A1 | 7/2008 | |
| DE | 102007062839 | A1 | 6/2009 | |
| DE | 102008057582 | A1 | 5/2010 | |
| DE | 102010040097 | A1 | 3/2011 | |
| DE | 102009048763 | A1 | 4/2011 | |
| DE | 102011080312 | A1 | 2/2012 | |
| DE | 102010044754 | A1 | 3/2012 | |
| DE | 102010045617 | A1 | 3/2012 | |
| DE | 102010050133 | A1 | 5/2012 | |
| DE | 102011009059 | A1 | 7/2012 | |
| DE | 102011081601 | A1 | 7/2012 | |
| DE | 102011005404 | A1 | 9/2012 | |
| DE | 102011007672 | A1 | 10/2012 | |
| DE | 102011111368 | A1 | 2/2013 | |
| DE | 102011112515 | A1 | 2/2013 | |
| DE | 102013105377 | A1 | 11/2014 | |
| DE | 102013111974 | A1 | 4/2015 | |
| EP | 2217478 | A1 | 8/2010 | |
| EP | 1874602 | B1 | 12/2012 | |
| JP | 10252705 | A * | 9/1998 | ............ E02F 9/2232 |
| WO | 2009059619 | A1 | 5/2009 | |
| WO | 2012017037 | A2 | 2/2012 | |
| WO | 2012028568 | A1 | 3/2012 | |
| WO | 2012031718 | A2 | 3/2012 | |
| WO | 2013030113 | A1 | 3/2013 | |

OTHER PUBLICATIONS

International Search Report dated Mar. 30, 2015 in International Application No. PCT/EP2014/069650.
Search Report dated Jul. 10, 2014 in DE Application No. 102013111974.3.
International Search Report dated Mar. 30, 2015 in International Application No. PCT/EP2014/069723.
Int'l Preliminary Report on Patentability dated Mar. 31, 2016 in International Application No. PCT/EP2014/069650.
Int'l Preliminary Report on Patentability dated Mar. 31, 2016 in International Application No. PCT/EP2014/0696723.

\* cited by examiner

ELECTRICALLY-DRIVEN PRESSURE REGULATOR AND VOLUME-DELIVERY UNIT

CROSS REFERENCE TO RELATED APPLICATIONS

This application is a Section 371 U.S. National Stage Filing of International Application No. PCT/EP2014/069723, filed Sep. 16, 2014, which was published in the German language on Mar. 19, 2015, under International Publication No. WO 2015/036623 A2, which claims priority to German Patent Application No. 10 2013 110 188.7, filed on Sep. 16, 2013, and German Patent Application No. 10 2013 111 974.3, filed on Oct. 30, 2013, the disclosures of which are incorporated herein by reference.

The invention relates to an electrically-driven pressure regulator- and volume-delivery unit according to the preamble of Claim 1.

PRIOR ART

The prior art comprises piston or geared pumps, which are generally driven by combustion engines and deliver a volume flow in a fixed relationship to the speed of the combustion engine. Embodiments of pumps allowing a variable delivery capacity are axial piston pumps with adjustable swash plates, or variable vane pumps. For a demand-oriented delivery these pumps are electrically driven.

The abovementioned pumps are mechanically very expensive and complicated to build and because of relatively high leakage do not allow precise pressure regulation by motor positioning control.

Pumps are also known that are based on a dual-action reciprocating piston, delivering by means of a forward and backwards movement (bicycle pump principle). The dual-action reciprocating piston is connected via two non-return valves with a reservoir and via two further non-return valves with the consumer. Double stroke piston pumps in an electrically driven form are known from DE 10 2006 030 141.2. Such double stroke piston pumps are significantly simpler to build than axial piston pumps and vane pumps.

Finally, from DE 2011 080312 a braking system is known with a dual-action reciprocating piston driven by a linear actuator, in which in the hydraulic lines leading from the pressure chambers to the wheel brakes sequence valves are arranged, wherein the hydraulic lines can be connected via a supplementary valve.

A disadvantage of the design of the dual-action reciprocating piston from DE 2001 080312 is that the hydraulic connection between the front and back of the dual-action reciprocating piston passes through three valves, which have a major throttling effect. This makes rapid switching between forward and return stroke operation impossible. In addition, during the forward stroke it is impossible to switch to smaller active surfaces, since for such a function a more rapid pressure balance between the chambers is necessary. In DE 2011 0803212 it is simply the effect of the different cross sectional areas that is used to achieve a higher pressure in the return stroke (Claim 15). Dynamic switching between the forward and return stroke is not provided for in DE 2011 0803212, and in addition the reliability of the operating principle for use as a pump for forward and return stroke operation is low.

OBJECT OF THE INVENTION

The object of the invention is to provide an electrically-driven pressure regulator- and volume-delivery unit with high delivery capacity and accurate and dynamic pressure control.

ACHIEVEMENT OF THE OBJECT

The object of the invention is achieved by the features of Claim 1.

With the achievement according to the invention a pressure regulator- and volume-delivery unit electrically driven by a linear actuator or a motor-transmission unit based on the dual-action reciprocating piston principle is provided, which can accurately build up pressure or deliver volume in a demand-oriented manner and allow rapid switching between differing hydraulically active surfaces. To this end, avoiding throttling losses is critical from a functional point of view.

This can be achieved by connecting the front and back of the dual-action reciprocating piston via switching valves having large flow cross-sections and a direct connection between the front and back via a short hydraulic line with low flow resistance, which in the area of the end stroke of the dual-action reciprocating piston connects the first chamber with the starting stroke of the dual-action reciprocating piston of the second chamber. The length of the connection is thus approximately as big as the entire stroke of the dual-action reciprocating piston. For a low-flow design the dual-action reciprocating piston and connecting line usefully form part of a hydraulic block, which connects the two chambers by bore holes. The switching valve is preferably also arranged in the hydraulic block. Alternatively, a plurality of valves can also be connected in parallel, in order to improve the flow resistance, or to allow the use of serially produced standard valves with small flow cross-section. The valves must also be designed for high differential pressures. By using just one valve or connecting valves in parallel rather than having three valves in series (DE 2011 0803212) the reliability of the dual-action reciprocating piston is also guaranteed in forward and return strokes. Should one of the three valves of DE 2011 0803212 fail, operation is no longer possible, but with the achievement according to the invention the reliability is very high and, in addition, by connecting the valves in parallel full functional redundancy can be achieved.

Furthermore, for the purposes of optimisation (downsizing of the linear actuator) the choice of cross-sectional areas between the front and back of the dual-action reciprocating piston is crucial. A ratio of the areas between the front and back of the dual-action reciprocating piston of 1.5 to 2.5, preferably 2 should be selected here, in order to achieve effective downsizing.

With the invention or its versions and further developments both variable delivery capacities and precise pressure control can be achieved or functionally represented.

In addition, with the achievement according to the invention in the forward stroke highly dynamic switching between two differing working cross-sections is possible. Since in many motor applications in vehicles an interruption in pressure build-up is functionally undesirable (in braking systems, for example, a build-up of pressure from 0 to 120 bar must be possible with no, or very few, interruptions), highly dynamic switching to a second active surface must take place. If this can be functionally implemented by connecting the two chambers of the dual-action reciprocating piston with low flow resistances, the smaller active cross-sectional surfaces can be used at high pressures in order to reduce the power/torque demand of the linear actuator at the forward stroke stage. This allows significant downsizing of the linear drive. A downsized linear actuator also has a low moving mass/inertial mass. This leads to further advantages when switching between forward and return strokes.

At higher pressures (primarily>40% of the maximum pressure) the dual-action reciprocating piston is operated in the forward and return strokes. In this operating mode both in the forward and return strokes smaller active hydraulic areas are in operation. The switching between forward and return strokes is highly dynamic. This control strategy can be applied for operation at high pressures, where small interruptions in the pressure build-up/flow rates through switching from forward stroke to return stroke operation can be tolerated. The low flow resistances in combination with the low moving mass/inertial mass of the linear actuator minimise the dead time during switching. As a result of the smaller active surfaces the torque requirement of the linear actuator is reduced and so the linear actuator can be operated at high rotational/linear speeds. Despite the linear actuator being smaller, as a result of the higher rotational speeds high flow rates or pressure build-up gradients can be achieved. In addition, the volume of the dual-action reciprocating piston unit can be significantly reduced, if delivery can take place in both the forward and return strokes.

Furthermore, accurate pressure control is functionally implemented via path control of a linear actuator both during pressure build-up and also optionally during pressure reduction. For this a pressure-volume (path) curve is mapped via a pressure sensor as a model and used for control.

Alternatively, to the linear actuator the dual-action reciprocating piston can also be operated via a motor-transmission solution. In this case, which is not described in more detail, a transmission is positioned between the motor and the dual-action piston connecting rod, which also allows a right-angled arrangement of the dual-action reciprocating piston relative to the motor.

The device according to the invention also allows one or more hydraulic consumers to be supplied highly efficiently with pressure and volume, and at the same time a guarantee of accurate control of the consumers. The main application is for hydraulic consumers in motor vehicles.

Advantageous configurations or further developments of the invention are contained in the other claims, to which reference is made here.

Figure 1A:
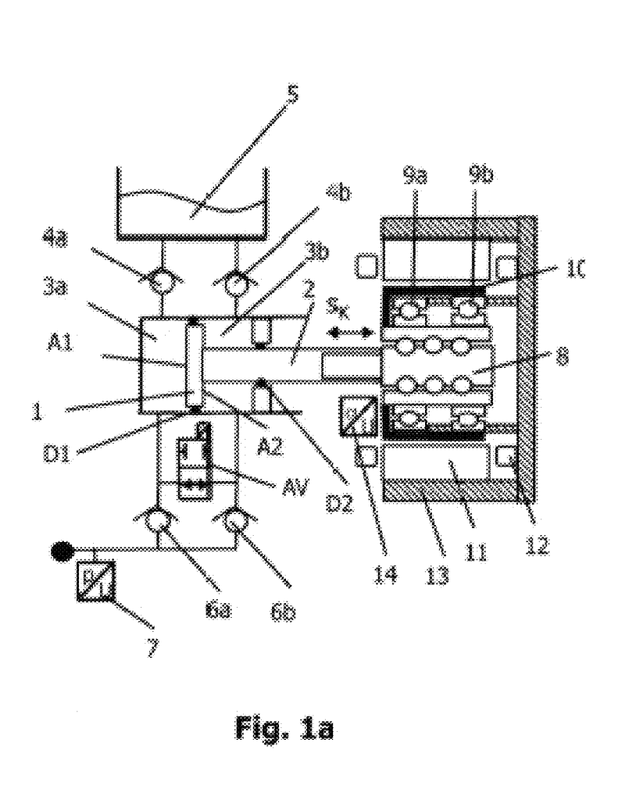
FIG. 1a the basic construction of a pressure regulator- and volume-delivery unit (hereinafter also referred to as a pressure regulator unit) with motor-transmission unit for supplying pressure to a circuit.
Figure 1B:
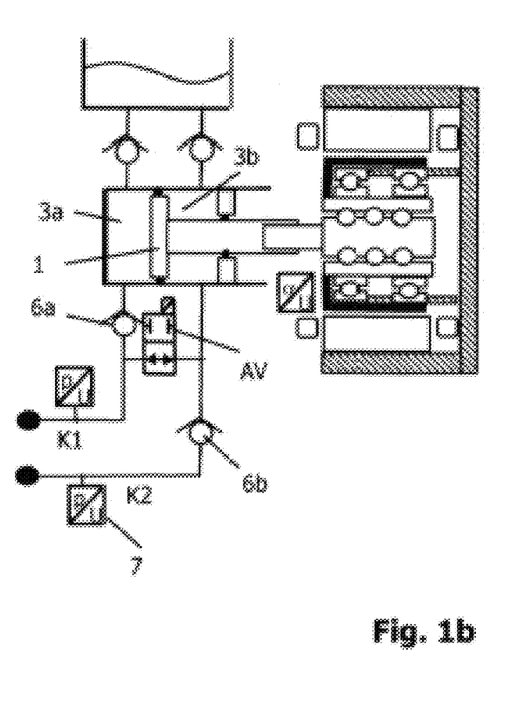
FIG. 1b the basic construction of the pressure regulator unit with motor-transmission unit for supplying pressure to two circuits.
Figure 1C:
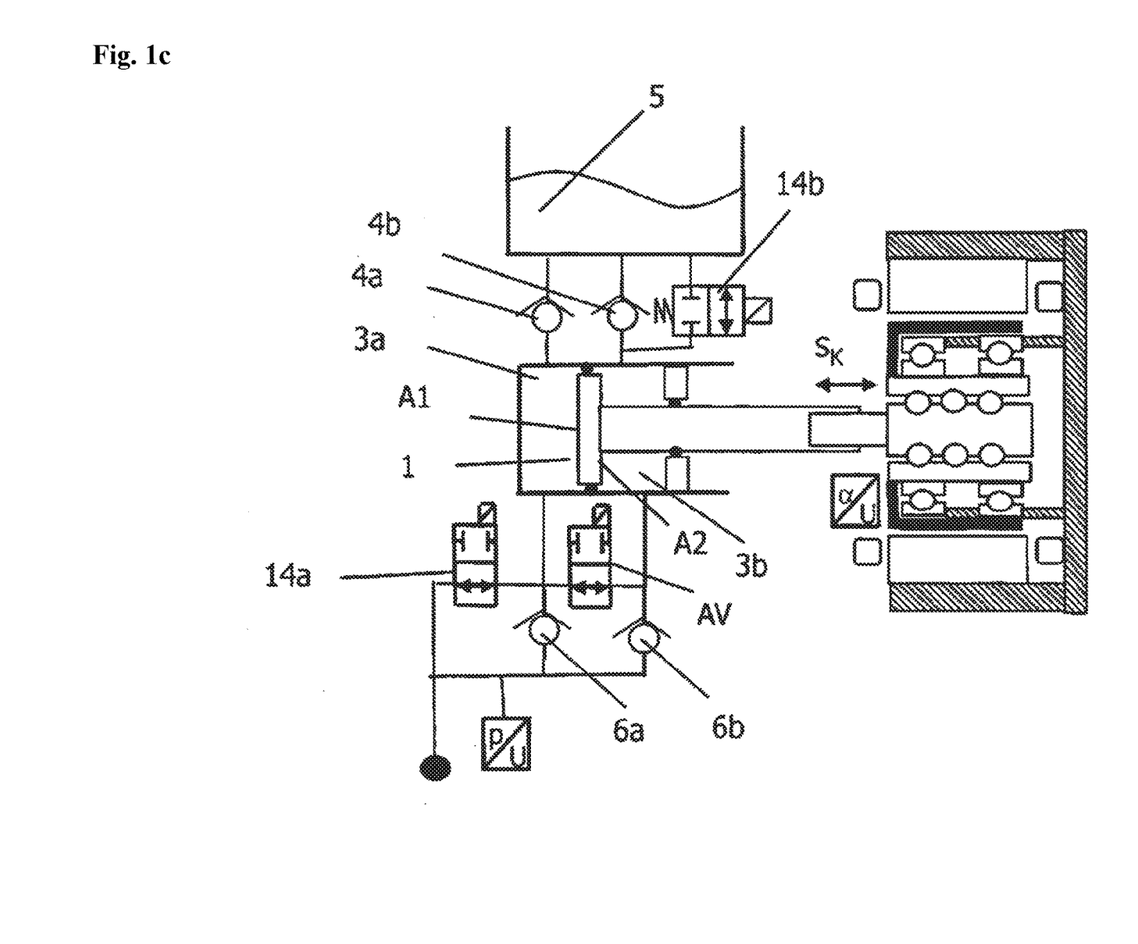
FIG. 1c an extension of the pressure regulator to include valves for pressure build-up and reduction by means of piston displacement control.

In other words, with the achievement according to the invention or its embodiments and further developments, inter alia the following functions can be provided or the following advantages achieved:

variable flow rates via speed control of the motor and switchable active surfaces both in the forward and return stroke;

very high flow rates in the entire pressure range;

precise pressure control through path control rather than pressure control via the pressure-volume/path relationship both during pressure build-up (design of FIGS. 1a, 1b, 2) and pressure reduction (design of FIG. 1c);

demand-oriented, energy-efficient pressure generation (pressure-on-demand);

supply of multiple hydraulic consumers in multiplexed operation by switching consumers on and off by means of valves;

highly compact, cost-effective pressure volume delivery unit through downsizing of the motor by reducing the power/torque demand by means of two switchable hydraulic cross-sectional areas;

very high degree of freedom with optimisation of hydraulic systems (elimination of expensive valves, connection of multiple consumers to a single hydraulic source).

Thanks to the degree of freedom and accurate pressure control, switching of the valves of consumers can be simplified (e.g. replacement of costly proportional valves by simple solenoid valves), in addition the linear drive can be significantly simplified by the switchable active surfaces.

In a variant, two further switchable valves are used (FIG. 1c), which connect one chamber of the dual-action reciprocating piston with the reservoir and replace a non-return valve and in the connection between the second chamber of the dual-action reciprocating piston connect with the consumer and replace a non-return valve.

A number of consumers can be connected to the pressure regulator- and volume-delivery unit, which can be switched on and off via solenoid valves.

DESCRIPTION OF FIGURES

The invention is described in more detail in the drawing, using the figures below.

These show as follows.

FIG. 1a shows the basic construction of a pressure regulator- and volume-delivery unit (hereinafter also referred to as a pressure regulator unit) comprising a piston 1 working on both sides (hereinafter also referred to as a dual-action reciprocating piston), which by means of a push-rod 2 can be displaced in both directions along the path sk. The dual-action reciprocating piston 1 delimits a first pressure chamber 3a with active surface A1 and a second pressure chamber 3b with active surface A2. The ratio of the cross-sections of the surfaces A1 and A2 is approximately 2:1, at least 1.5:1 and a maximum of 2.5:1. This ratio corresponds approximately to the ratio between the maximum pressure and typical working pressure. Both chambers 3a, 3b are connected by means of non-return valves 4a and 4b to a reservoir 5. The non-return valves have a large opening cross-section, so that throttling effects are avoided. In addition, between the chambers 3a, 3b a switchable pressure compensation valve AV is arranged. The switchable valve is designed as a switching valve, not a throttle valve, and has a large flow cross-section. In addition, the front and back of the dual-action reciprocating piston are directly connected by means of short hydraulic lines with low flow resistance. The line section connecting the pressure chambers or the hydraulic lines leading from these to the consumer, and containing the switching valve AV, is as short as possible and begins at least at a pressure chamber as far as possible directly at the outlet of the piston-cylinder unit. In particular, it is intended in this area to avid as far as possible elements increasing flow resistance, such as additional valves and so on. Alternatively, instead of one switching valve a number of switching valves can also be connected in parallel. A parallel connection allows standard valves from large-scale production to be used. By switching the pressure compensation valve AV a connection can be created between the front and back of the dual-action reciprocating piston 1 and in the forward stroke differing active surfaces can be created by pressure compensation.

The pressure regulator unit has connections to a consumer by means of two further non-return valves 6a and 6b, having a large cross-section and which during pressure build-up can be rapidly opened without electrical operation. The AV valves are thus under load only when switching between forward and return strokes, or switching the cross-sectional areas. For example, if the pressure regulator unit is used in a braking system (36 cm$^3$ volume), when switching up to 100 bar typically a cross-section of the AV valve of approximately 5 mm$^2$ is necessary. Typically, rapidly switching ball seat valves have a cross-section of 0.8-1.4 mm2. If pressure compensation has to take place via 2 valves (according to the prior art DE 2011 0803212), connection of the valves in series would require at least 4 times the cross-sectional area of the valves. If in addition account is taken of the fact that 4 lines connect the valves with corresponding flow and valve connection resistances to be considered, a further increase in the cross-sectional area is necessary and a rapid switching at high pressures is technically unfeasible. A rapid switching of such larger valves is technically very difficult to implement, and very expensive, and a hindrance to normal operation without switching. Such large valves switch very slowly and must be activated for each pressure/delivery operation, and are therefore under load for each change in pressure/volume and so in view of the large number of operations are not fail-safe. A failure of one valve leads to the loss of the switching function, which can result in a failure of the entire system, as sufficient volume for the pressure build-up is no longer available or the delivery has to be interrupted. Technically speaking, therefore, it is crucial for the AV valve to be arranged in front of the non-return valves 6a and 6b and the volume flow to the consumer to be delivered via non-return valves only. In addition, diagnostics on the AV-valve can be performed for each forward stroke and leakages can be identified early. In the connection a pressure sensor 7 is also arranged. The pressure regulator unit is driven by means of a motor-spindle drive. The motor-spindle drive has a ball screw drive 8 and a motor rotor 10 supported by two bearings 9a and 9b, and equipped with permanent magnets. The rotor speed and angular position are determined via a sensor 14. The motor also has a stator 11 with exciter coils 12 and is accommodated in a housing 13. Between chambers 3a and 3b seals D1 are arranged on the dual-action reciprocating piston 1 and between chamber 3b and active surface A2 and push-rod piston 2 seals D2 are arranged.

The dual-action reciprocating piston 1 can be operated in forward and return strokes. In the forward stroke when the valve AV is closed the surface A1 is active, and with the valve AV open the surface A2-A1, since a pressure compensation between the two chambers can take place. In the return stroke the valve AV is closed and surface A2 is active.

Advantageously, the ratio between the surface A1 and A2 is approximately a factor of 2, so that in the forward and return strokes the same small surface A2 can be used for control and during switching no compensating volume flows and pressure drops are active.

FIG. 1b shows the same basic construction as FIG. 1 with the difference that the non-return valve 6a is arranged before the switching valve AV and two hydraulic circuits K1 and K2 are supplied from the pressure regulator unit. When the valve AV is closed, in the forward stroke circuit 1 and in the return stroke circuit 2 is supplied with pressure. With the AV valve open in the forward and return strokes both circuit 1 and circuit 2 are jointly supplied. The two-circuit nature of the pressure regulator unit is highly important in fault critical systems, or braking systems.

FIG. 1c shows the pressure regulator unit from FIG. 1a with the addition of two switchable valves 14a and 14b. Valve 14a is arranged between the pressure circuit and the front pressure chamber 3a, and valve 14b between the rear pressure chamber 3b and reservoir 5 in a line containing a bypass section to the non-return valve 4b. By opening the two valves 14a, 14b through the return stroke of the dual-action reciprocating piston 1 the pressure can be reduced in a controlled manner via path control sk.

Figure 2:
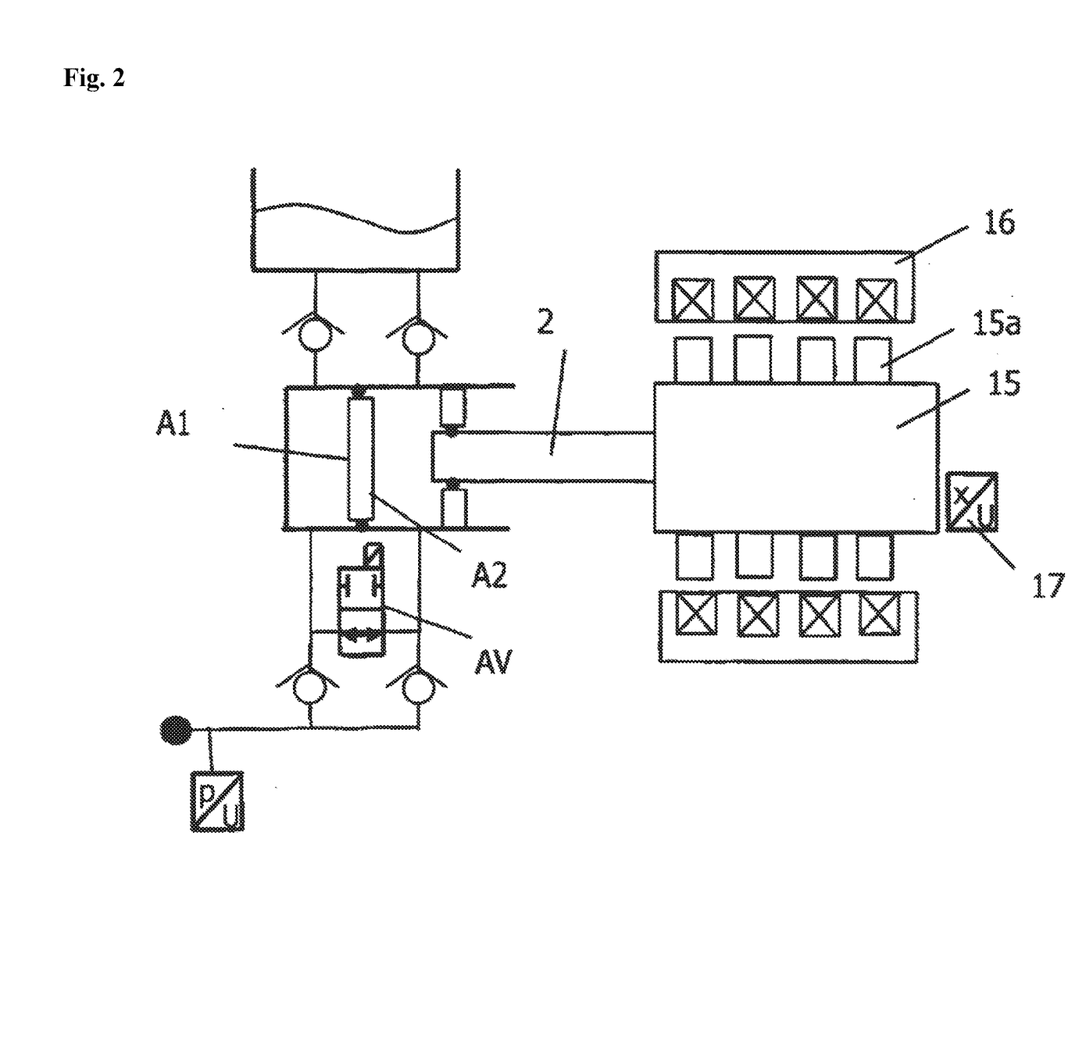
FIG. 2 the basic construction of the pressure generator unit with linear actuator drive.

FIG. 2 describes the same pressure regulator unit as FIG. 1a with the difference that the push-rod piston 2 can be operated via a linear actuator, comprising an armature 15 with permanent magnets 15a, a stator with exciter coils 16 and a linear path sensor 17. It functions in the same way as in FIG. 1a. Linear actuators have advantages over motor-transmission units, if the dual-action reciprocating piston is designed for small travels and low forces arise in the system.

Figure 3:
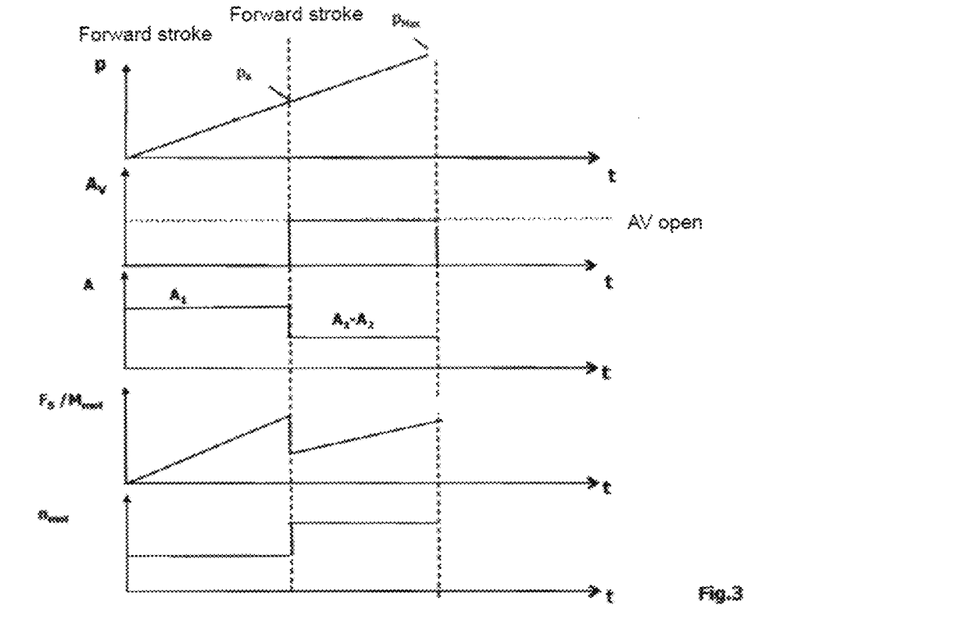
FIG. 3 control strategy for pressure build-up during the piston forward stroke.

FIG. 3 describes the control process in the forward stroke with constant flow rate with the parameters pressure p, switching state of the valve AV, active surface A, piston rod force/motor torque and motor speed. As a rule, pumps or pressure regulator units are designed for the maximum pressure pMax, with the rated working pressure pA generally being half of this. By way of example, the locking pressure in braking systems is 80-100 bar while the maximum pressure is 180-200 bar. The pressure generator unit is usefully switched in the region of the maximum working pressure pA from the active surface A1 to the second surface A1−A2 through the opening of the valve AV. The result of this is that the motor torque/push-rod force is reduced in the ratio of the surfaces A2/(A2−A1). In order to maintain a constant pressure rise time, the motor speed must be increased by the ratio of the surfaces. Generally, this is not a problem since at lower torques motors can deliver higher speeds (see further explanation on FIG. 5a to FIG. 5c), or at high pressures the flow rates no longer have to be so great. By way of example, in braking systems the pressure rise time to the blocking pressure of 100 bar is operationally very important but high pressures may be slow to build up without restricting the required function.

Figure 4:
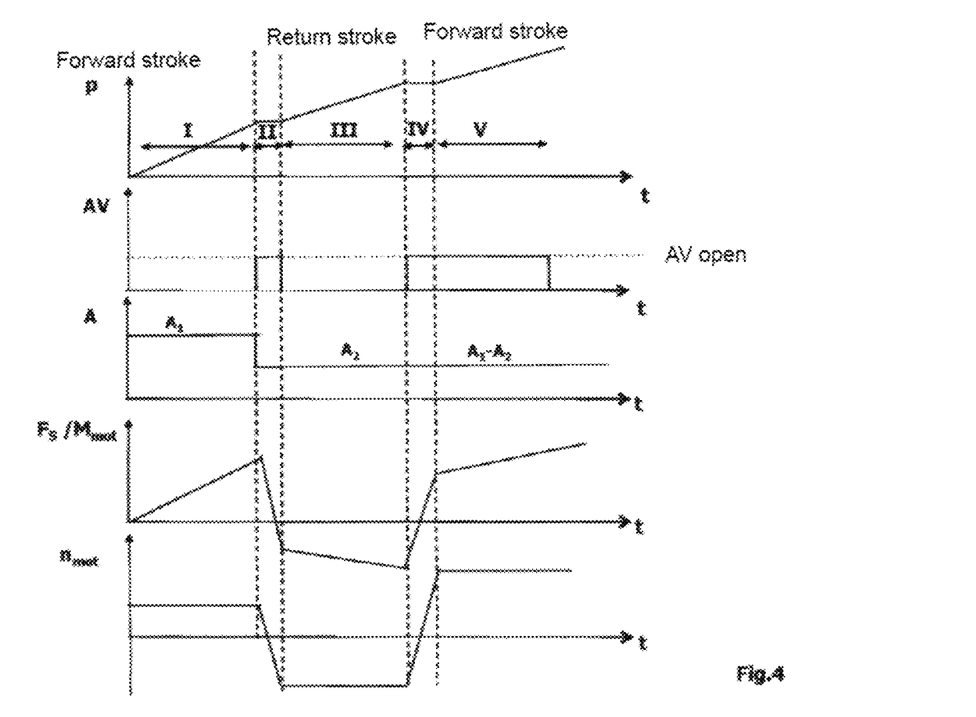
FIG. 4 control strategy for pressure build-up during the piston forward and return stroke.

FIG. 4 describes the control process in forward and return stroke operation. Operation with forward and return strokes is therefore advantageous, since the volume of the pressure generator unit can be designed to be smaller. In a first Phase I, in the forward stroke with active surface A1, which is approximately twice the size of A2, pressure is built up at a constant speed. In Phase II switching takes place to the return stroke with the smaller active surface A2, with a change in direction of rotation of the motor, and simultaneous pressure compensation with opened valve AV. The motor is accelerated according to the ratio A2/A1, that is to say by approximately a factor of 2 to a higher negative speed of rotation and the forces/torques are halved. During the switching phase the pressure is approximately constant. Since this normally takes place very quickly, the dead time is less than 10 ms and is unnoticeable. In Phase III the further pressure build-up takes place in the return stroke with a closed AV valve, before in Phase IV being switched back to the forward stroke for further delivery/pressure build-up in Phase V. In this Phase the signs of the forces and torque and speeds change. For a ratio of A2/A1=2, A2=A1−A2, therefore the absolute value of the speeds/torques does not change compared to Phase III.

Switching to half the surface has the result that the motor torque can be designed for essential maximum torques, leading to essential cost reductions for the drive unit. This is described in more detail in FIGS. 5a-5c.

Figure 5A:
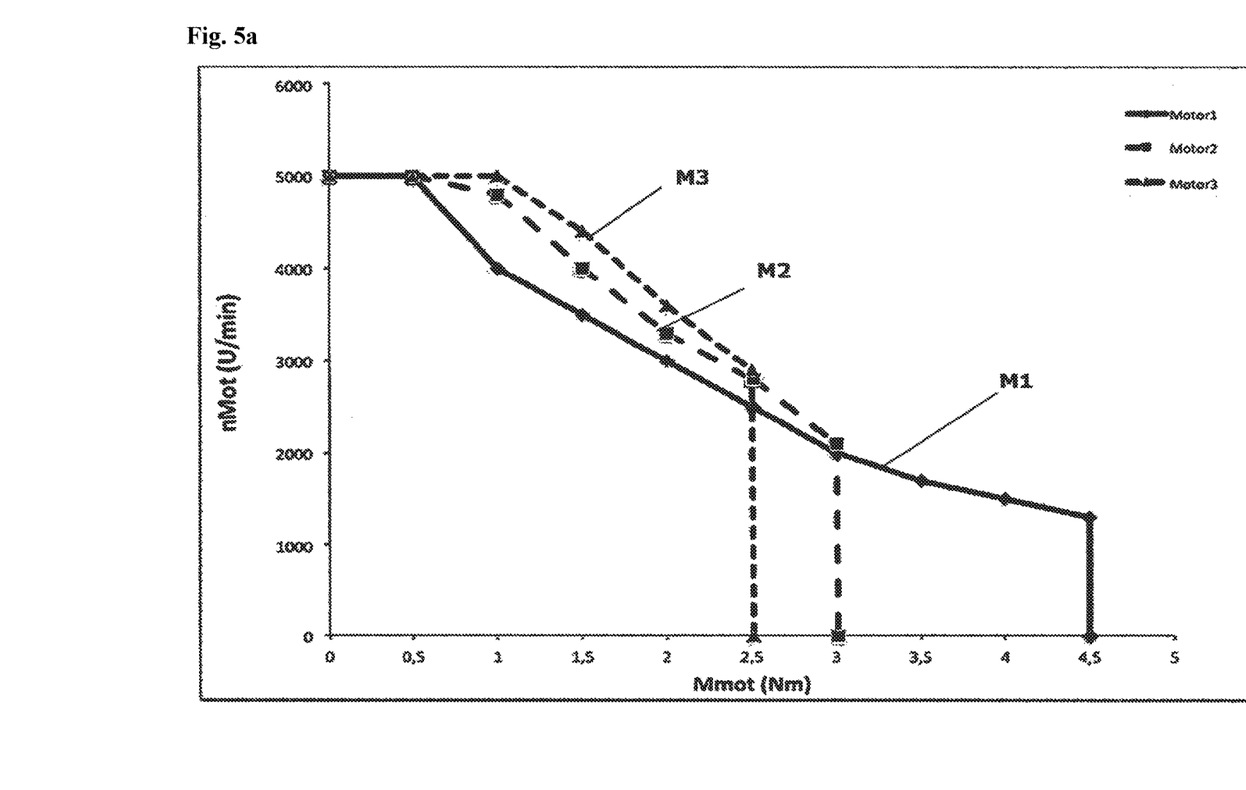
FIG. 5a effect of motor scaling on speed-torque curves.

FIG. 5a describes the relationship between a motor length scaling to the speed-torque characteristics of an electric motor operated at constant voltage and limited to maximum speed. This representation serves to explain the optimisation potential of the pressure generator unit according to the invention. Three motor designs are shown with different motor lengths (motor M1: l=30 mm, motor M2: l=20 mm, motor M3: l=16 mm). If the torque is reduced via a length reduction, the torque constant drops and the speed increases. At lower torques smaller motors can generate higher speeds and have no losses of performance, but conversely generally increase in performance, especially in pulsed mode, where thermal boundary conditions are not relevant.

Figure 5B:
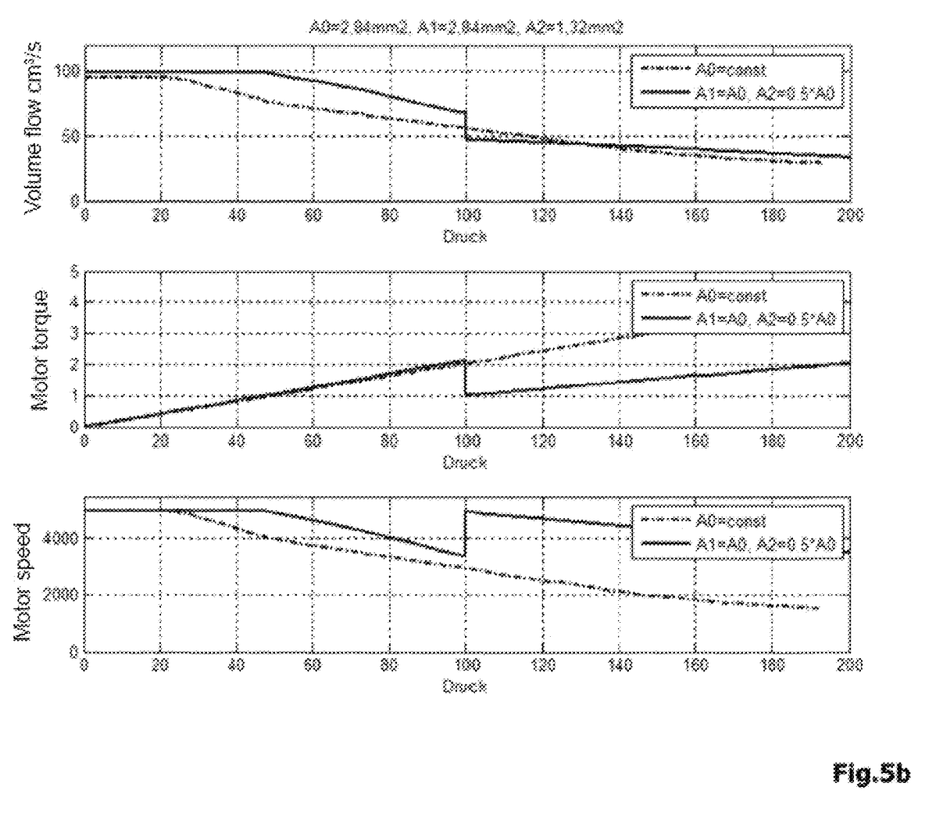
FIG. 5b performance of the pressure regulator unit as a result of motor downsizing and use of the switchable surfaces.

FIG. 5b describes the potential of the pressure regulator unit according to the invention with two active surfaces in connection with a downsized motor. A comparison is provided between the pressure control with a constant surface A0 and motor M1 and a design of the pressure regulator unit according to the invention with surface dimensions A1=A0 and A2=0.5*A1 and use of the motor M3 from FIG. 5a. Volume flow, motor torque and motor speed are shown for operation at up to 200 bar and a switching point at 100 bar. The comparison of the simulation shows that despite using the smaller motor M3, up to 100 bar higher volume flows can be generated and above 100 bar the volume flow is approximately the same, since the motor can maintain higher speeds even at high pressures. The motor torque and ultimately the push-rod force is only half as great.

This effect leads to significant cost advantages: use of a motor with low weight and costs and reduction in the load on the ball screw, both being significant costs for example in an electrical braking system. Performance can also be increased.

Figure 5C:
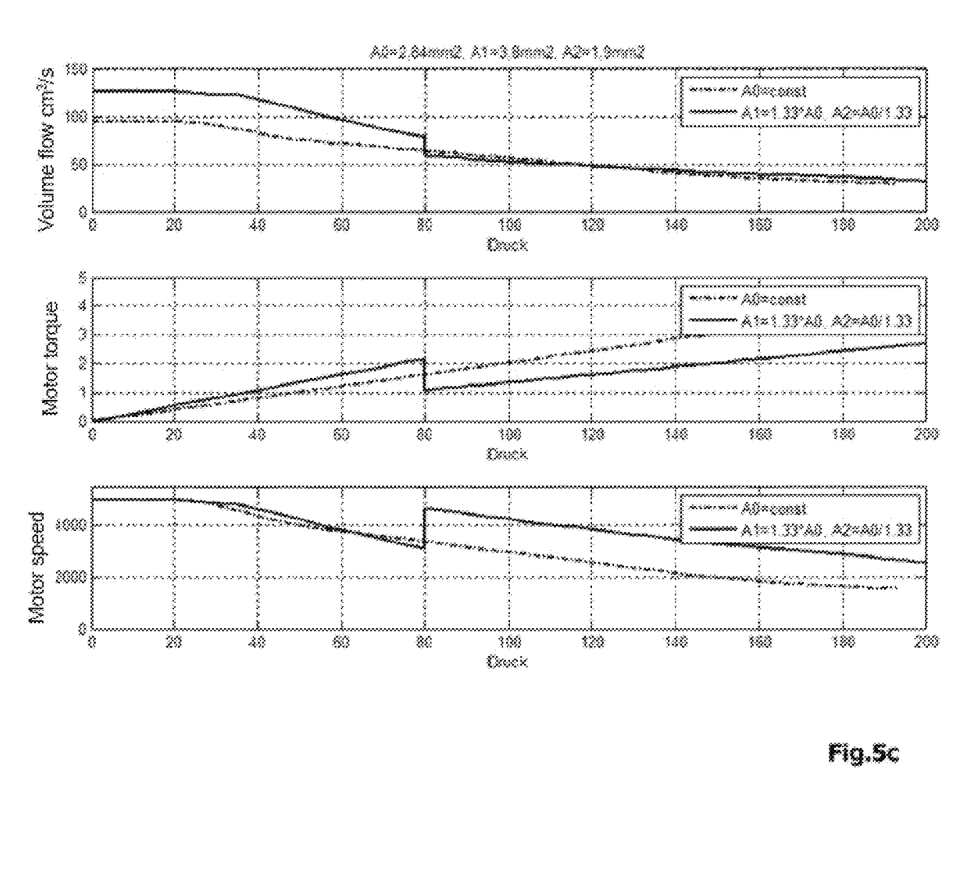
FIG. 5c performance of the pressure regulator unit as a result of motor downsizing and use of the switchable surfaces.

FIG. 5c describes the effect of an alternative design. Again a comparison is made with a design having constant areas and motor M1. This time the pressure regulator unit according to the invention used is designed with areas A1=1.33*A0 and A2=A0/1.33 and motor M2. The ratio A1/A2 is 2 and the average surface is A0. This time switching takes place at 80 bar. This design leads to an even more significant increase in flow rate in the lower pressure range. In motor vehicles with large and non-rigid consumers (e.g. braking systems with lining air gap and soft brake callipers) this is of major importance. In such motor vehicles a rapid pressure build-up in the lower pressure range is desired and particularly advantageous, if a system allows this. In this way costs and weight of brake callipers, for example, can be significantly reduced. In addition, considerable potential still exists for weight savings by downsizing of the motor and the ball screw.

Figure 6:
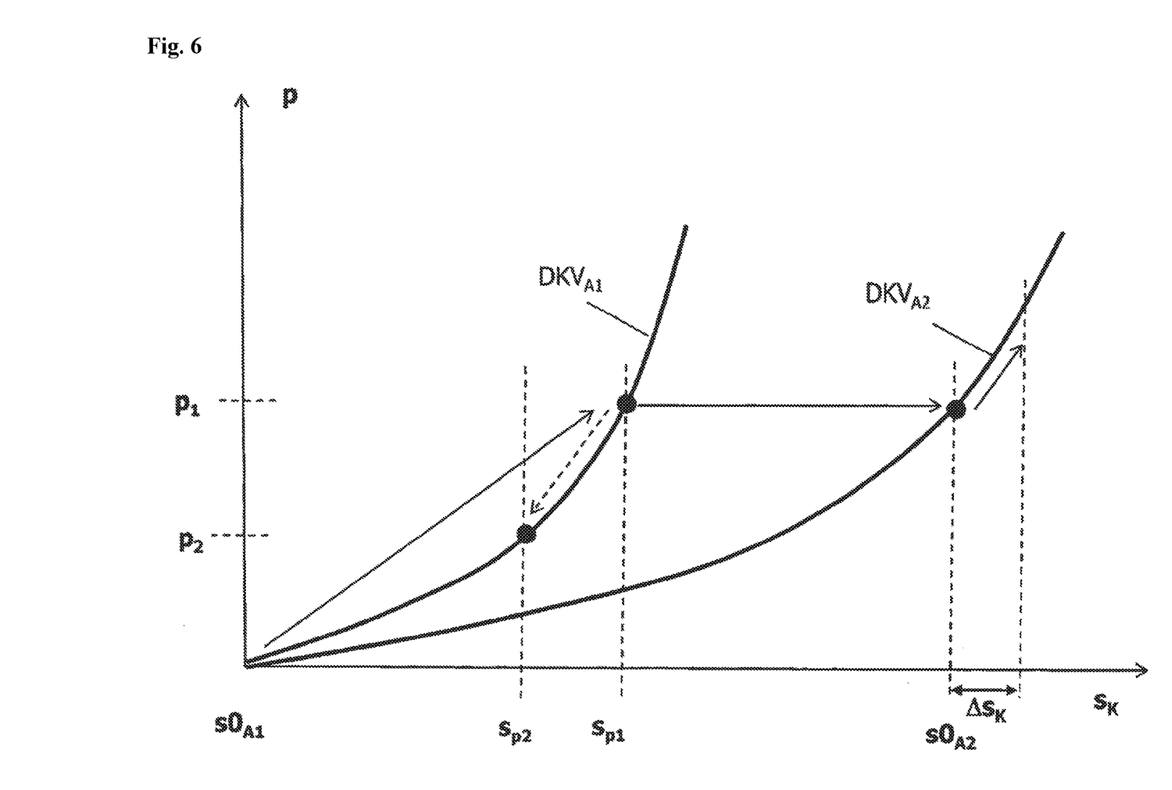
FIG. 6 pressure control process taking into account the switchable surfaces.

FIG. 6 describes the control strategy for accurate pressure control by modelling a pressure-volume (path) curve in a relationship between push-rod path sk and pressure p. For modelling the pressure-volume curve the pressure sensor 7 of FIGS. 1a, 1b, 1c, 2 is used. In operation the pressure-volume curve can be calibrated.

A relationship between the chamber surfaces of the dual-action reciprocating piston of A/A2=2 is taken as a basis in the representation. The pressure build-up commences from a starting pressure s0A1. A desired control pressure p1 is set by operating the linear actuator as far as Position Sp1. For the regulation the pressure-stroke curve is taken as a basis which reflects the nonlinear relationship between pressure and path. Lower pressures than p1 can also be applied via the pressure-path curve. When switching to the active surface A2 the pressure-volume curve shifts. The result is a new reference path s0A2. Pressure changes can be set by setting differential paths □sk. The path-controlled pressure control strategy has the advantage that the pressure can be adjusted significantly better if the control takes place by means of the stroke and not using the pressure sensor, since in this way pressure variations and elasticities in the pressure line do not affect the control as disturbance variables and high demands do not have to be placed on the accuracy of the pressure sensors.

If the pressure regulator unit according to FIG. 1c is used, via the path control sk the pressure can also be controlled during reduction via the pressure-path relationship (broken arrow).

Figure 7:
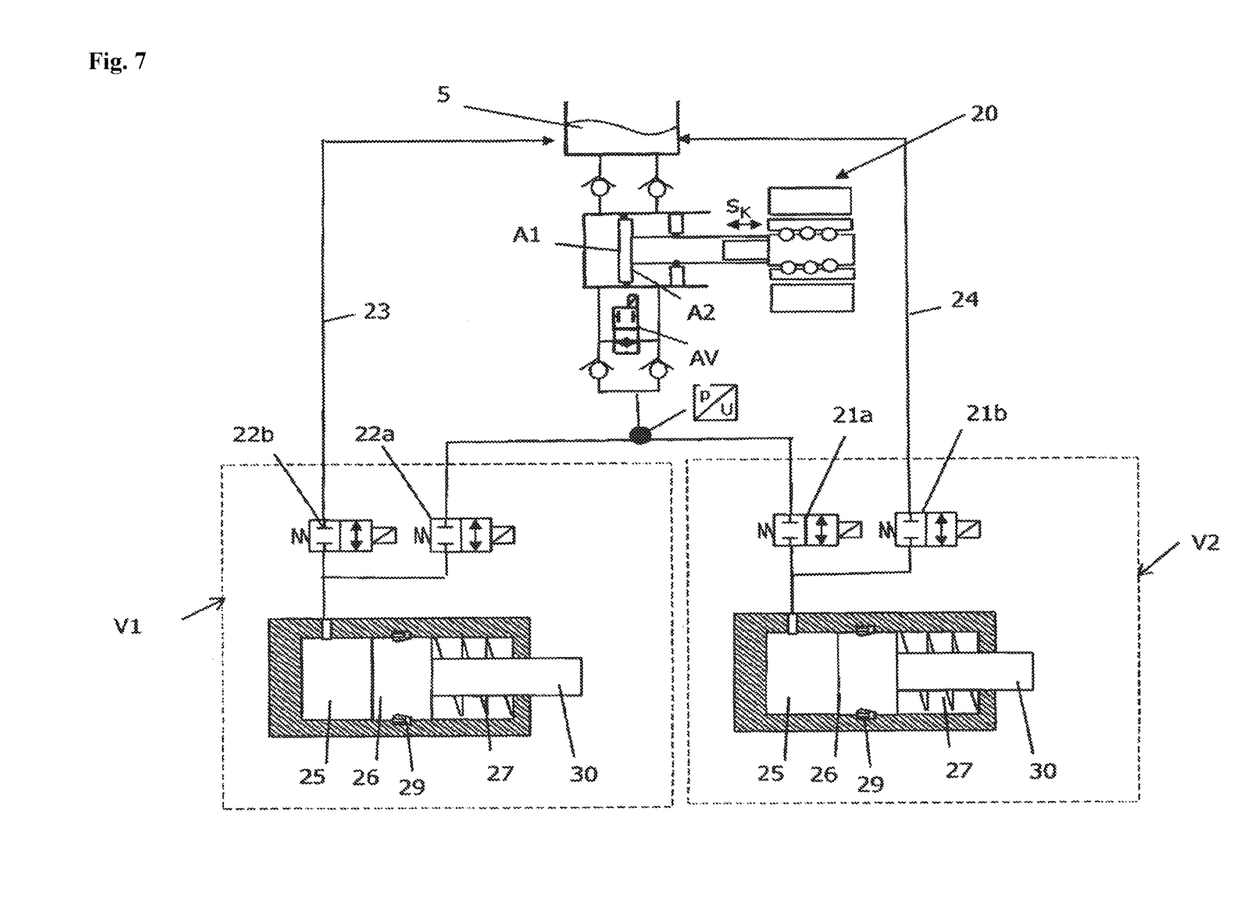
FIG. 7 use of the pressure regulator unit for multiple consumers with pressure reduction by means of solenoid valves.

FIG. 7 describes an application of the pressure regulator unit 20 (according to the description in FIG. 1a) with a number of consumers V1 and V2. Each consumer has two pressure build-up valves 21a and 22a and 2 pressure relief valves 21b and 22b, connected to a reservoir 23 via lines 23 and 24. A working piston with a pressure chamber 25, a piston 26, reset by a spring 28 and a working rod 30, sealed in a housing via a seal 29, is actuated.

The pressure build-up takes place via the valves 22a and 21a with accurate pressure control via pressure-path curve, as a result of which for the operation of both systems only one pressure sensor is necessary. The pressure reduction takes place via timing control of the pressure relief valves 21b and 22b, wherein the relief valves 21b and 22b are designed as throttle valves.

Figure 8:
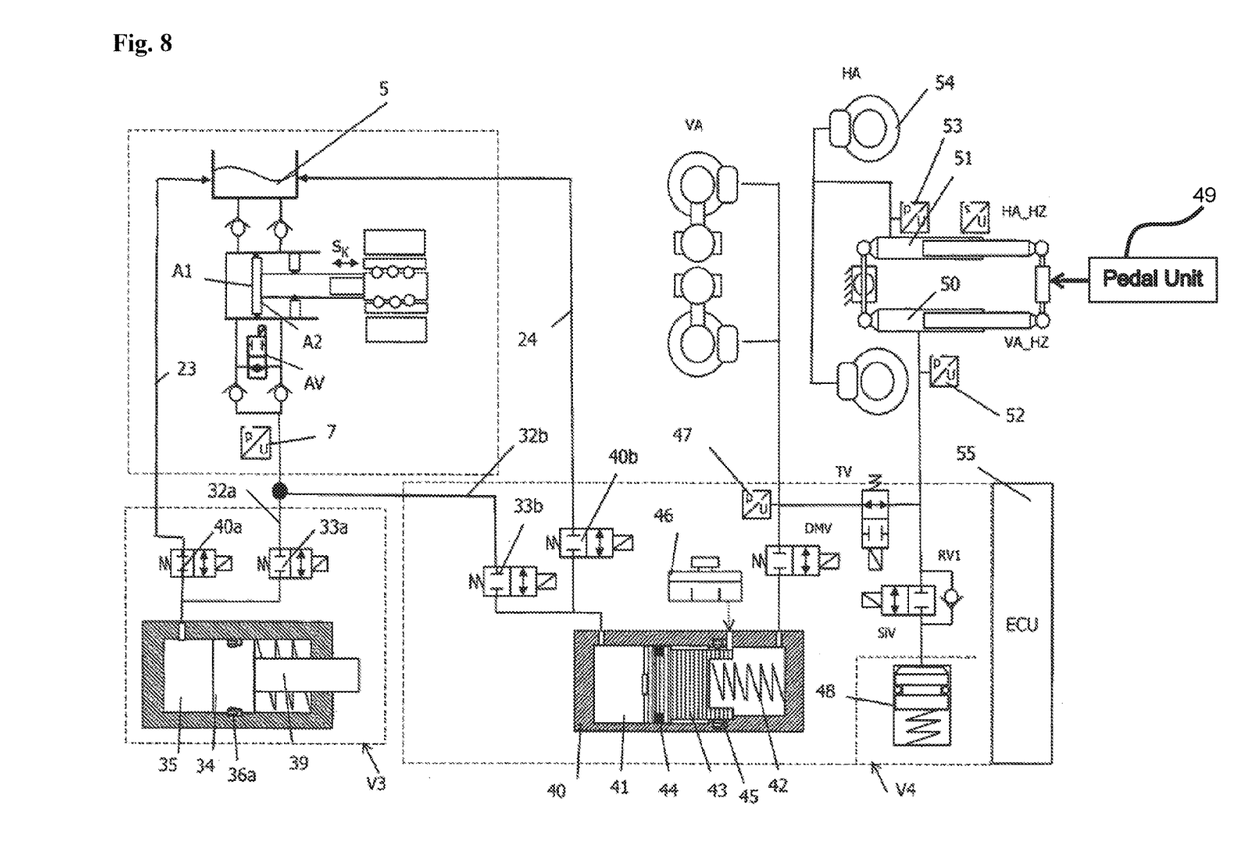
FIG. 8 use of the pressure regulator unit as a central pressure generator unit for a braking system.

FIG. 8 shows the use of the pressure regulator unit 20 when employed as the central pressure supply for a number of consumers such as a hydraulic complete system comprising a braking system and further consumers: consumer V3, a device with a control piston-cylinder-unit 34, for example for a clutch actuation; and consumer V4, a decentralised braking system, as for example used in motorsports for pressure control of the axles. Decentralised braking systems with a central pressure source are becoming increasingly important in motorsports, since they allow a weight advantage, if a number of systems can be supplied from a central pressure source. In this case the pressure regulator unit replaces a pump with a high-pressure accumulator and allows the very complex proportional valves to be eliminated as simple control via switching valves can be achieved. The pressure regulator unit is designed in accordance with FIG. 1a, but the pressure regulator unit according to FIG. 1c and FIG. 2 can also be used. The pressure regulator unit has a central pressure sensor 7 and is connected via two lines 32a and 32b and solenoid valves 33a and 33b with the control piston 34 of the consumer V3 and the control piston cylinder unit 40 of the braking system V4.

The control piston cylinder unit 34 comprises a pressure chamber 35, seals 36, and a ram 37, which is reset via a spring 38. A working piston 39 transfers the force. Pressure is built up via a solenoid valve 33a and reduced via a solenoid valve 40a. If a pressure regulator unit according to FIG. 1c is used, the solenoid valve 40a is omitted and the pressure is built up and reduced via solenoid valve 33a.

The control piston cylinder unit 40 has a different design, since media separation exists. For braking systems in particular, media separation between the hydraulic circuit and the braking circuit is necessary. The control piston 43 therefore separates a pressure chamber 41 filled with hydraulic fluid and a second pressure chamber 42 (with brake fluid). The pressure chambers are separated via the control piston 43 and seal 44. In addition, a second expansion port seal 45 is provided, via which, when the piston is reset, brake fluid can be demanded from a further reservoir 46. The control piston transfers the pressure via a DMV valve to the front axle of the motor vehicle. A further pressure sensor 47 is provided for pressure control. Pressure build-up takes place via the valve 33b, and pressure reduction via valve 44b into the reservoir. As for consumer V3 this valve is omitted, if the pressure regulator unit according to FIG. 1c is used. The pressure build-up and pressure reduction is performed via valve 33b.

The braking system further contains an isolation valve TV, a path simulator, and a safety valve SiV. The braking system is connected via the isolation valve with a circuit 50 of the actuation unit of the pedal unit 49. The second circuit 51 is connected to the rear axle. Further pressure sensors 52, 53 and a path sensor 54 for the pedal travel are provided. Pressure regulation of the front axle in active mode is controlled via the path simulator. In the event of a fault (e.g. failure of the path simulator) the SiV is closed and the TV opened. In addition, the DMV valve is closed. The pedal force is then directly on the front axle. An ECU is also provided for the braking system, in which the valve control and evaluation of the pressure sensors takes place.

KEY

1 Piston acting on both sides or dual-action reciprocating piston
2 Push-rod piston
3a Chamber
4a Non-return valve
4b Non-return valve
5 Reservoir
6a Non-return valve
6b Non-return valve
7 Pressure sensor
8 Ball screw drive
9a Bearing
9b Bearing
10 Rotor
11 Stator
12 Exciter coils
13 Housing
14 Sensor
15 Armature
15a Permanent magnets
16 Stator with exciter coils
17 Linear path sensor
20 Pressure regulator unit
21a Pressure build-up valve
21b Pressure reduction valve
22b Pressure reduction valve
23 Line
24 Line
32a Line
32b Line
33a Solenoid valve
33b Solenoid valve
34 Control piston-cylinder-unit
35 Pressure chamber
36 Seal
37 Ram
38 Spring
39 Working piston
40 Control piston-cylinder-unit
41 Pressure chamber
42 Pressure chamber
43 Control piston
44 Seal
45 Expansion port seal
46 Reservoir
47 Pressure sensor
48 Path simulator
49 Pedal unit
50 Hydraulic circuit
51 Hydraulic circuit
52 Pressure sensor
53 Pressure sensor
54 Path sensor
55 Electrical control unit (ECU)
AV Pressure compensation valve, switchable
D1 Seal
D2 Seal
K1 Hydraulic circuit
K2 Hydraulic circuit
SiV Safety valve
Sk Path
TV Isolation valve
V1 Consumer
V2 Consumer
V3 Consumer or clutch actuation
V4 Consumer or braking system

What is claimed is:

1. A pressure-volume delivery system comprising:
a piston-cylinder unit with a piston acting on both sides, said piston having at least two active surfaces of different sizes, and wherein each active surface of the piston is associated with a respective pressure chamber of the piston, wherein the pressure chambers of the piston are connected via hydraulic lines with at least one consumer, and the piston-cylinder unit also including a drive coupled to the piston and configured to drive the piston in a reciprocating manner, and
a connecting line configured to connect the pressure chambers and/or the hydraulic lines, the connecting line having a short design and a sufficiently low flow resistance so as not to throttle flow, wherein the connecting line is configured with one or more switching valves, wherein in the case of multiple switching valves, the multiple switching valves are connected in parallel with each other, the one or more switching valves having a sufficiently large cross-flow section so as not to throttle flow when the one or more switching valves is/are open,
wherein:
(a) the different sized active surfaces of the piston are in a ratio of between 1.5 and 1 to between 2.5 and 1, to each other,
and/or
(b) delivery capacity/pressure build-up of the piston-cylinder-unit is enabled to be varied by means of the switchable valve by varying switchable active surfaces in the forward stroke and the delivery unit being operated in forward and return strokes.

2. The pressure-volume delivery system according to claim 1, further comprising non-return valves arranged in one or more of the lines to the at least one consumer, wherein the non-return valves open towards the at least one consumer with a large opening cross-section sufficient not to throttle flow, wherein at least one of the non-return valves is arranged between a line section of the connecting line connecting the pressure chambers and having one of the one or more switching valves, and the consumer.

3. The pressure-volume delivery system according to claim 2, wherein one of the non-return valves is arranged in the line section connecting the pressure chambers and having the one of the one or more switching valves.

4. The pressure-volume delivery system according to claim 1, further comprising a further switching valve arranged in a line section connecting a pressure chamber of the piston-cylinder unit with the consumer as a bypass for a non-return valve.

5. The pressure-volume delivery system according to claim 1, further comprising at least one hydraulic line connecting the pressure chambers of the piston-cylinder-unit with a reservoir, and
non-return valves closing towards the reservoir arranged in the at least one hydraulic line connecting the pressure chambers with the reservoir.

6. The pressure-volume delivery system according to claim 5, wherein one of the at least one hydraulic line connecting the pressure chambers leading to the reservoir is a line from the pressure chamber associated with a smaller of the active surfaces, and further comprising a switching valve arranged in the line from the pressure chamber associated with the smaller of the active surfaces in a bypass circuit to one of the non-return valves.

7. The pressure-volume delivery system according to claim 1, wherein the drive comprises a linear actuator.

8. The pressure-volume delivery system according to claim 1, further comprising at least one sensor, wherein the at least one sensor is configured to directly or indirectly measure a piston path of the piston-cylinder-unit.

9. The pressure-volume delivery system according to claim 1, wherein the system is configured for supplying at least two consumers and is hydraulically connected with these at least two consumers.

10. The pressure-volume delivery system according to claim 9, wherein at least one consumer is assigned, respectively, a pressure build-up valve connected with the piston-cylinder-unit and a pressure reduction valve connected with a reservoir.

11. The pressure-volume delivery system according to claim 1, wherein a delivery capacity of the piston-cylinder-unit is determined by a speed control of a rotation motor or a stroke frequency control of a linear motor.

12. The pressure-volume delivery system according to claim 1, wherein pressure control takes place by means of path control of the piston during pressure build-up and/or pressure reduction.

13. The pressure-volume delivery system according to claim 1, wherein pressure supply to at least two consumers takes place in multiplexed operation, by isolation of the consumers by means of valves.

14. A method for supplying pressure with a variable delivery rate and/or accurate pressure dosing, the method comprising using the pressure-volume-delivery system according to claim 1 to supply pressure to the at least one consumer, and performing volume and/or pressure metering using the piston acting on both sides.

15. The method according to claim 14, wherein the switching valve or valves are operated only upon switching between forward and return strokes of the piston or switching between the at least two active surfaces and is/are not operated upon pressure build-up in the piston-cylinder unit with a larger one of the at least two active surfaces of the piston in the forward stroke of the piston.

16. The method according to claim 15, wherein the switching from the large active surface of the piston to the small active surface takes place in a region of maximum working pressure in normal operation, which is lower by a factor of approximately 2 than a maximum pressure of the system.

17. The method according to claim 14, wherein the delivery capacity of the piston is created by speed control or stroke frequency control of a motor.

18. The method according to claim 14, wherein pressure regulation takes place by use of a pressure-volume curve of the piston-cylinder-unit.

19. The method according to claim 14, wherein delivery capacity of the piston is created by varying the active surfaces of the piston in a forward stroke of the piston, and operating the delivery system in forward and return strokes at high pressures.

20. The method according to claim 14, wherein forward and return strokes of the piston take place with switching of the one or more switching valves at least twice between forward and return strokes of the piston during pressure build-up.

21. The method according to claim 14, wherein pressure control takes place by means of path control of the piston during pressure build-up and/or during pressure reduction.

22. The method according to claim 14, wherein pressure supply to at least two consumers takes place in multiplexed operation, in particular by isolation of the consumers by means of valves.

23. A pressure-volume delivery system comprising:
a piston-cylinder unit with a piston acting on both sides, said piston having at least two active surfaces of different sizes, and wherein each active surface of the piston is associated with a respective pressure chamber of the piston, wherein the pressure chambers of the piston are connected via hydraulic lines with at least one consumer and with a drive for the piston-cylinder unit, and
a connecting line configured to connect the pressure chambers and/or the hydraulic lines, the connecting line having a short design and a sufficiently low flow resistance so as not to throttle flow, wherein the connecting line is configured with one or more switching valves, wherein in the case of multiple switching valves, the multiple switching valves are connected in parallel with each other, the one or more switching valves having a sufficiently large cross-flow section so as not to throttle flow when the one or more switching valves is/are open, wherein delivery capacity/pressure build-up of the piston-cylinder-unit is enabled to be varied by means of the switchable valve by varying switchable active surfaces in the forward stroke and the delivery unit being operated in forward and return strokes.

24. An activation system for a motor vehicle brake, the activation system comprising:

an activation device, a piston-cylinder unit with a piston acting on both sides, said piston having at least two active surfaces of different sizes, and wherein each active surface of the piston is associated with a respective pressure chamber of the piston, wherein the pressure chambers of the piston are connected via hydraulic lines with a hydraulic brake circuit, to provide compressant to and pressurize the hydraulic brake circuit, and also including a drive coupled to the piston and configured to drive the piston in a reciprocating manner, and a connecting line configured to connect the pressure chambers and/or the hydraulic lines, the connecting line having a short design and a sufficiently low flow resistance so as not to throttle flow, wherein the connecting line is configured with one or more switching valves, wherein in the case of multiple switching valves, the multiple switching valves are connected in parallel with each other, the one or more switching valves having a sufficiently large cross-flow section so as not to throttle flow when the one or more switching valves is/are open, wherein:

(a) the different sized active surfaces of the piston are in a ratio of between 1.5 and 1 to between 2.5 and 1, to each other, and/or (b) delivery capacity/pressure build-up of the piston-cylinder-unit is enabled to be varied by means of the switchable valve by varying switchable active surfaces in the forward stroke and the delivery unit being operated in forward and return strokes.

* * * * *